United States Patent [19]

Matsunaga et al.

[11] 4,141,748
[45] Feb. 27, 1979

[54] AEROSOL STARCH COMPOSITION

[75] Inventors: Kinjiro Matsunaga, Funabashi; Yukiko Sone, Tokyo; Yunosuke Nakagawa, Koshigaya, all of Japan

[73] Assignee: Kao Soap Co., Ltd., Tokyo, Japan

[21] Appl. No.: 819,152

[22] Filed: Jul. 26, 1977

[30] Foreign Application Priority Data

Aug. 2, 1976 [JP] Japan ................... 51-92690

[51] Int. Cl.$^2$ ................... C08L 3/08; C08J 3/02; C09K 3/30
[52] U.S. Cl. ................... 106/212; 106/213; 252/305; 252/321; 252/358
[58] Field of Search ................... 252/305; 106/213, 212

[56] References Cited

U.S. PATENT DOCUMENTS

| 3,117,014 | 1/1964 | Klug | 106/213 |
| 3,547,854 | 12/1970 | Roth et al. | 252/305 X |
| 3,686,120 | 8/1972 | Creely | 252/305 X |
| 4,023,978 | 5/1977 | Messina | 106/213 |

Primary Examiner—Richard D. Lovering
Attorney, Agent, or Firm—Blanchard, Flynn, Thiel, Boutell & Tanis

[57] ABSTRACT

An aerosol starch composition consists essentially of 5 to 30 wt % of a propellant and 70 to 95 wt % of a liquid composition consisting essentially of 2 to 10 wt % of a modified starch, 0.1 to 2 wt % of a poorly water-soluble polyalkylene glycol or derivative thereof and the balance is water.

7 Claims, No Drawings

AEROSOL STARCH COMPOSITION

BACKGROUND OF INVENTION

1. Field of Invention

The present invention relates to an aerosol starch composition having a good sprayability.

2. Description of Prior Arts

Starches used in ordinary households are divided into concentrate type starches which are used in the form of a water dilution into which clothes and the like are dipped and aerosol type starches which are directly sprayed onto cloths and the like.

When a concentrate type starch is used, after a cloth has been sufficiently impregnated with the starch solution and dried, water is scattered on the cloth by a sprayer and the cloth is ironed. In this case, the starch is not left on the surface of the cloth in the form of a white film. However, in case of an aerosol type starch, ironing is often conducted before the sprayed paste composition is sufficiently impregnated into a cloth, and in this case, a white solid starch is left locally on the surface of the cloth, resulting in a poor appearance and other troubles, especially when the cloth is a colored or patterned cloth.

SUMMARY OF INVENTION

The present invention has been completed as a result of research works made with a view to overcoming this defect of aerosol type starches. Namely, the present invention is based on the finding that a starch formed by adding a poorly water-soluble polyalkylene glycol or derivative thereof to a specific starch solution and filling the resulting composition into an aerosol can has a good sprayability and it does not leave a white residue on the surface of a cloth even when the cloth is ironed.

More specifically, in accordance with the present invention, there is provided an aerosol starch composition comprising 2 to 10% of a modified starch selected from the group consisting of hydroxyalkylated starches having hydroxyalkyl groups of 2 to 4 carbon atoms and carboxyalkylated starches having carboxyalkyl groups of 2 to 4 carbon atoms (having a viscosity of 5 to 30 cp as measured with respect to a 5% aqueous solution at 20° C.) and 0.1 to 2% of a poorly water-soluble polyalkylene glycol or derivative thereof selected from the group consisting of polypropylene glycol (molecular weight 1,000 to 20,000) and polybutylene glycol (molecular weight 500 to 10,000) and propylene oxide or butylene oxide adduct to polyhydric alcohols having 2 to 6 carbon atoms (molecular weight 1,500–10,000) (having a water-solubility lower than 2% at 25° C.).

As the low viscosity modified starch that is used as a polymeric starch base in the present invention, there can be mentioned, for example, hydroxyalkylated starches and carboxyalkylated starches. Modified starches prepared by reacting an alkylene oxide having 2 to 4 carbon atoms or a halogenated carboxylic acid having 2 to 4 carbon atoms with a slurry containing an alkali material and a starch and treating the reaction product with an oxidizing agent such as hydrogen peroxide, sodium hypochlorite or the like to reduce the viscosity are conveniently used in the present invention. As preferred examples of the modified starch to be used in the present invention, there can be mentioned hydroxyalkylated starches having a hydroxyalkyl group having 2 to 3 carbon atoms, that is hydroxyethylated starch and hydroxypropylated starch. The low viscosity modified starch that is used in the present invention has a viscosity of 5 to 30 cp, preferably 8 to 15 cp, as measured with respect to a 5% aqueous solution at 20° C. When the viscosity is too low, a good stiffness cannot be given to a cloth. In contrast, if the viscosity is too high, a good spray state cannot be attained.

When a poorly water-soluble polyalkylene glycol or derivative thereof is added to a solution of the above-mentioned modified starch, a very good sprayability can be attained.

As the polyalkylene glycol, there can be mentioned, for example, polypropylene glycol (molecular weight 1,000–20,000, preferably 1,500–10,000) and polybutylene glycol (molecular weight 500–10,000), and as the polyalkylene glycol derivative, there can be mentioned, for example, propylene oxide or butylene oxide adducts to polyhydric alcohols having 2 to 6 carbon atoms (molecular weight 1,500–10,000, preferably 3,000–10,000). As the polyhydric alcohol having 2 to 6 carbon atoms, there can be mentioned, for example, ethylene glycol, propylene glycol, diethylene glycol, glycerin, sorbitol and mannitol. Among them, the use of polypropylene glycol or propylene oxide adduct to glycerine is especially preferred in the present invention. By the term "poorly water-soluble" is meant that the water solubility is not more than 2%, especially not more than 0.1%, as measured at 25° C.

In the present invention, the poorly water-soluble polyalkylene glycol or derivative thereof is used in an amount of 0.1 to 2.0%, preferably 0.2 to 1%.

The poorly water-soluble polyalkylene glycol or derivative thereof is not completely dissolved in an aqueous starch solution, and therefore, it is dissolved also in the phase of liquefied propane or a mixture thereof with butane as a propellant.

According to this invention, an aerosol starch composition consists essentially of 5 to 30 wt %, preferably 7 to 20 wt %, of a propellant and 70 to 95 wt %, preferably 80 to 93 wt %, of a liquid composition consisting essentially of 2 to 10 wt % of a modified starch, 0.1 to 2 wt % of a poorly water-soluble polyalkylene glycol or derivative thereof and the balance is water. As the propellant, there may be used LPG (liquid petroleum gas) such as one mainly comprising propane or butane. An aerosol starch composition of this invention can be effectively sealed in a container at a pressure of 2 to 4 atm, preferably 2.5 to 3.5 atm.

The composition of the present invention may further comprise a non-ionic surface active agent, an ironing lubricant such as polyethylene glycol or silicone, a perfume, a fluorescent dye, other additive and a solvent such as ethyl alcohol according to need.

The present invention will now be described by reference to the following Examples.

EXAMPLE 1

A 5% aqueous solution of a hydroxypropylated starch (having a degree of substitution of 0.12 and a viscosity of 10 cp as measured with a 5% aqueous solution) was prepared and filled in an aerosol can, and liquefied propane (having an inner pressure of 3.1 Kg) was filled in the can at an aqueous starch solution/liquefied propane weight ratio of 70/30 to form an aerosol starch (hereinafter referred to as "aerosol starch A"). When this aerosol starch A was sprayed on a black-dyed cotton cloth, foams were observed. The cloth was allowed to stand still for 1 minute after spraying and was then ironed by using an automatic iron, Model HIA-412 manufactured by Toshiba, while setting the dial to "cotton". The starch residue was observed here and there on the surface of the cloth, and the appearance of the cloth was bad.

Separately, 0.5% of polypropylene glycol (having a molecular weight of 4,000 and a water solubiltity lower than 0.1%) was added to the above aqueous starch solution, and an aerosol starch (hereinafter referred to as "aerosol starch B") was prepared in the same manner as described above. When the aerosol starch B was sprayed to a cotton cloth, foams were scarcely observed, and scarcely any white residue was left on the surface of the cloth after ironing.

The foaming property was quantitatively determined in the following manner. Namely, a 100 cc capacity graduated cylinder equipped with a plug was charged with 50 cc of the starch solution, and the cylinder was strongly shaken in the vertical direction. Immediately, the amount of foam was measured, and also the time required for the foam to disappear was measured. Obtained results are shown below.

| Sample | Amount (cc) of Foam | Foam Disappearing Time (seconds) |
|---|---|---|
| A | 5.8 | 10 |
| B | 0.7 | below 1 |

EXAMPLE 2

A spray starch packed in an aerosol can was prepared in the same manner as described in Example 1 according to the following formulation by using polyvinyl alcohol (B-05 manufactured by Denki Kagaku Kogyo) or hydroxypropylated starch (having a degree of substitution of 0.17 and a viscosity of 9.5 cp as measured with respect to a 5% aqueous solution). In the case of the starch of the polyvinyl alcohol type, foaming was caused on the surface of a cloth on spraying, but when the hydroxypropylated starch was used, foaming was hardly caused.

| | |
|---|---|
| Polyvinyl alcohol or hydroxypropylated starch | 5% |
| Polyethylene glycol (molecular weight = 400) | 3% |
| Silicone emulsion (silicone of 6000 centistokes, effective content of 25%) | 0.5% |
| Diethylene glycol-propylene oxide adduct | 0.5% |
| Water | balance |

EXAMPLE 3

Spray starches packed in aerosol cans were prepared in the same manner as described in Example 1 according to the following formulation by using the additives indicated below, and each starch was tested with respect to the formation of the residue on the surface of a black cloth and the degree of foaming on the cloth. Further, the amount of foam and the foam disappearing time were determined in the same manner as described in Example 1. Obtained results are shown in the Table given below.

| | |
|---|---|
| Hydroxyethylated starch (having a degree of substitution of 0.14 and a viscosity of 12 cp as measured with respect to a 5% aqueous solution) | 4% |
| Partially esterified styrene-maleic anhydride copolymer (having a degree of esterification of 0.5) | 1% |
| Polyethylene glycol (having a molecular weight of 200) | 3% |
| Silicone emulsion (silicone of 6000 centistokes, effective content of 25%) | 0.5% |
| Additive (indicated in the Table given below) | 0.5% |
| Water | 91.0% |

Table

| Additive | Molecular Weight | Water Solubility (%) | Foaming on Cloth* | Residue on Cloth** | Amount (cc) of Foams | Foam Disappearing Time (seconds) |
|---|---|---|---|---|---|---|
| Polypropylene glycol | 200 | ∞ | ++ | + | 5.0 | 23 |
| " | 400 | ∞ | ++ | + | 4.3 | 20 |
| " | 750 | 3 | ++ | + | 4.2 | 8 |
| " | 1200 | 2 | − | − | 2.8 | <1 |
| " | 2000 | <0.1 | − | − | 0.6 | <1 |
| " | 4000 | <0.1 | − | − | 0.5 | <1 |
| Glycerin | 92 | ∞ | ++ | + | 5.5 | 20 |
| Glycerin-propylene oxide adduct | 600 | >100 | ++ | + | 5.3 | 12 |
| " | 1000 | >30 | ++ | + | 4.8 | 18 |
| " | 2000 | 1 | − | − | 2.3 | <1 |
| " | 3000 | 0.1 | − | − | 1.8 | <1 |
| " | 4000 | <0.1 | − | − | 2.0 | <1 |
| Polyethylene glycol | 400 | ∞ | ++ | + | 6.0 | 26 |
| " | 2000 | ∞ | ++ | + | 6.3 | 28 |
| Silicone emulsion (viscosity of silicone per se = 1000 centistokes) | − | − | + | + | 3.1 | 1 |
| not added | − | − | ++ | + | 6.2 | 25 |

Notes
++ conspicuous
+ relatively conspicuous
− hardly observed

The embodiments of the invention in which an exclusive property or privilege is claimed are defined as follows:

1. In a pressurized container having a discharge valve and charged with a self-propelling composition which can be dispensed in an aerosol mist form when said discharge valve is opened, the improvement which comprises:

said composition consists essentially of
(A) 5 to 30 wt % of a liquified normally gaseous propellant effective for discharging an aerosol of the composition when said discharge valve is opened and
(B) 70 to 95 wt % of a liquid composition consisting essentially of
  (i) 2 to 10 wt %, based on the weight of (B), of a modified starch selected from the group consisting of hydroxyalkylated starch containing hydroxyalkyl groups having 2 to 4 carbon atoms and carboxyalkylated starch containing carboxyalkyl groups having 2 to 4 carbon atoms, wherein said modified starch has the property that a 5% aqueous solution of said modified starch has a viscosity of 5 to 30 cp, at 20° C.,
  (ii) 0.1 to 2 wt %, based on the weight of (B), of a material selected from the group consisting of polypropylene glycol having a molecular weight of 1,000 to 20,000, polybutylene glycol having a molecular weight of 500 to 10,000, an adduct of propylene oxide to a polyhydric alcohol having from 2 to 6 carbon atoms wherein said propylene oxide adduct has a molecular weight of 1,500 to 10,000 and an adduct of butylene oxide to a polyhydric alcohol having 2 to 6 carbon atoms wherein said butylene oxide adduct has a molecular weight of 1,500 to 10,000, said material having a water solubility of not more than 2%, at 25° C., and
  (iii) the balance is water.

2. An aerosol starch composition as claimed in claim 1, in which said modified starch is a hydroxyalkylated starch containing a hydroxyalkyl group having 2 or 3 carbon atoms.

3. An aerosol starch composition as claimed in claim 1, in which the amount of said material is from 0.2 to 1 wt %.

4. An aerosol starch composition as claimed in claim 1, in which the water solubility of said material is not more than 0.1%, at 25° C.

5. An aerosol starch composition as claimed in claim 1, in which said material is polypropylene glycol having a molecular weight of 1,000 to 20,000.

6. An aerosol starch composition as claimed in claim 1, in which said material is a glycerin-propylene oxide adduct having a molecular weight of 1,500 to 10,000.

7. An aerosol starch composition as claimed in claim 1, in which said propellant is LPG.

* * * * *